United States Patent [19]

Nakagawa

[11] 3,916,398

[45] Oct. 28, 1975

[54] ANALOG INFORMATION STORAGE APPARATUS

[75] Inventor: Shiro Nakagawa, Chiba, Japan

[73] Assignee: TDK Electronics, Co., Ltd., Tokyo, Japan

[22] Filed: Oct. 2, 1974

[21] Appl. No.: 511,491

Related U.S. Application Data

[63] Continuation of Ser. No. 298,489, Oct. 18, 1972, abandoned.

[52] U.S. Cl. ........................ 340/174 AN; 340/174 PW; 340/174 TF; 340/174 WB

[51] Int. Cl.² ................. G11C 27/00; G11C 11/155

[58] Field of Search ............... 340/174 PW, 174 AN, 174 WB

[56] References Cited

UNITED STATES PATENTS 3,585,615 6/1971 Takahashi .................... 340/174 PW

OTHER PUBLICATIONS

IEEE Transactions on Magnetics, Vol. Mag.-4, No. 3 Sept. 1968, pg. 345–350.

IEEE Transactions on Magnetics, Vol. Mag.-4 No. 3 Sept. 1968, pg. 379 to 382.

*Primary Examiner*—James W. Moffitt
*Attorney, Agent, or Firm*—Wolfe, Hubbard, Leydig, Voit & Osann, Ltd.

[57] ABSTRACT

Analog information storage apparatus for stabilized memory, comprising a magnetic film plated wire consisting of a central conductor core wire and a magnetic film plated around the core wire and a driving means intersecting the plated wire. At the time of write-in, a current of a fixed intensity is passed through the driving means and an information current is passed through the central core wire to store the information and, at the time of read-out, a read-out current is passed through the driving means to read-out the stored information. The analog information is stored as a region of reversed magnetization, as compared to the "reset" state, having a length along the hard-magnetization axis of the plate wire proportional to the analog information value.

9 Claims, 18 Drawing Figures

ANALOG INFORMATION STORAGE APPARATUS

This is a continuation of application Ser. No. 298,489 now abandoned filed Oct. 18, 1972.

This invention relates to analog information storage system and, in particular, to an apparatus for implementing such system.

Generally, in magnetic film plated wire made by depositing such ferromagnetic substance as Permalloy to be of a thickness of about 0.5 to 1.0 micron on the periphery of such conductor wire or substrate as of phosphor bronze or beryllium bronze, the easy magnetization axis can be in the peripheral direction and the hard magnetization axis can be in the axial direction of the wire. The present invention reltaes to improvements in the analog information storage system using this kind of magnetic film plated wire.

As an analog information storage system using the magnetic film plated wire of the kind referred to, there has been already suggested a system wherein a number of pulses proportional to an analog information quantity to be stored are produced and a pulse current having a predetermined number of pulses is applied to a magnetic film plated wire so that the part magnetized in the peripheral direction in the magnetic film will be produced by quantity corresponding to the number of pulses and the analog information quantity will be stored. Such system has defects that the information is not stored accurately and thus the storage is unstable, that even if the same number of pulses are made to flow, the output voltage will be hard to fix and the linearity will not be high and that, as the information is stored as a number of pulses, the write-in operation is somewhat time consuming. In the present invention, analog informations are stored at a part as one range of the magnetic film along the hard magnetization axis and proportional to the information quantity, so that such problems as above in the elimination of unstable storage and the reduction of the write-in time will be successfully solved.

A main object of the present invention is to provide an analog information storage apparatus wherein the memory is stabilized.

Another object of the present invention is to provide an analog information storage apparatus wherein a large read-out voltage is obtained.

The present invention is to provide, further, an analog information storage apparatus which is not influenced by the variations with the lapse of time and the variations of the surrounding conditions.

As a related object, the present invention is to further provide an analog information storage apparatus having a multiplying function.

The present invention shall now be explained with reference to the accompanying drawings, in which.

Figure 1A:
FIG. 1A shows a magnetizing state in a conventional apparatus.
Figure 1B:
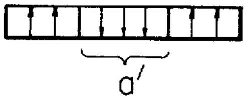
FIG. 1B shows a magnetizing state in the apparatus of the present invention.

Referring first to FIG. 1A which showing magnetic fields produced in a magnetic film in storage apparatus which uses a conventional magnetic film wire, a represents a magnetic field produced by pulses. In FIG. 1B showing magnetic fields produced in a magnetic film according the present invention, *a'* represents a range in which analog informations are stored. Depending on the information quantity, the range *a'* expands in the axial direction, i.e., in the direction of the hard magnetization axis.

Figure 2:
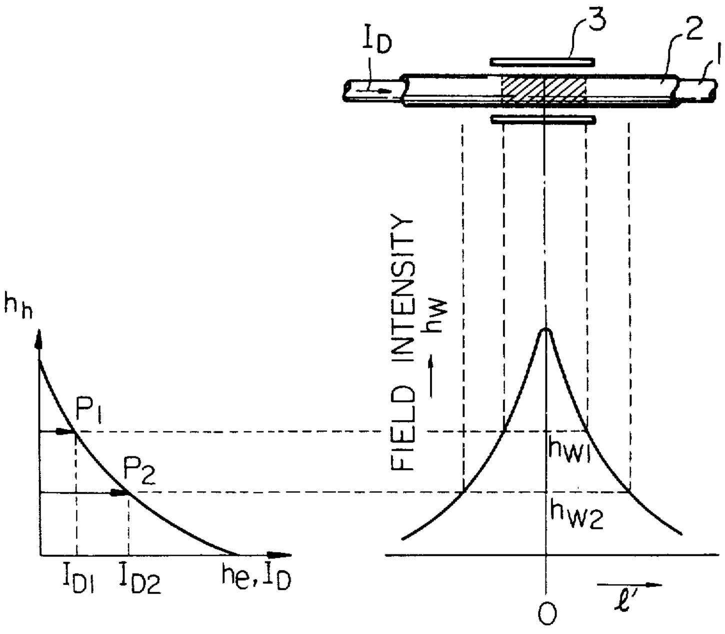
FIG. 2 shows an embodiment of the present invention, in conjunction with diagrams for explaining the principle of the present invention.

In the upper portion of FIG. 2 showing schematically an embodiment of the apparatus of the present invention, 1 is such conductor core wire as, for example, of phosphor bronze and 2 is such magnetic film as, for example, of Permalloy so as to form a so-called magnetic film plated wire. 3 is a strip line so arranged as to enclose the above mentioned magnetic film wire and to be a driving line for both writing-in and reading-out. The hatched part in FIG. 2 shows a part magnetized in the magnetic film in case all the magnetizing directions of the magnetic film plated wire are arranged preliminarily in a fixed direction and an electric current of any size is made to flow through the driving line 3 and conductor core wire 1, so as to give a magnetomotive force in a direction reverse to it. The magnetic field distribution within said magnetic film is symmetrical on the right and left as shown in right-hand diagram of FIG. 2 with the point O as an original point. In said diagram of FIG. 2, the abscissa represents a distance l foot from the original point and the ordinate represents a strength of the magnetic field.

In the case when the magnetic film is magnetized as mentioned above, if $h_e$ represents a strength of the magnetic field in the direction of the easy magnetization axis and $h_h$ represents a strength of the magnetic field in the direction of the hard magnetization axis, the relation between them will be an asteroid curve, even theoretically, as shown in left-hand diagram of FIG. 2 and will be represented by $$h_h^{2/3} + h_e^{2/3} = 1.$$

Therefore, if the current to be made to flow through the driving line 3 is taken to be constant and the current flowing through the conductor core wire 1 is $I_D$, $$h_e \propto I_D$$

and therefore the abscissa in left-hand diagram of FIG. 2 can be represented by $I_D$. Further, the curve in said left-hand diagram of FIG. 2 shows a final value reversing the magnetic field produced on the magnetic film. Therefore, the magnetization reversing range can be made a function of the current $I_D$. That is to say, when $I_D$ is $I_{D1}$, it will shift from the left-hand diagram to the right-hand diagram and the range of $h_{W1}$ will be magnetized. When $I_D$ is $I_{D2}$, the range of $h_{W2}$ will be magnetized and an analog storage will be able to be made. On the contrary, by reading this magnetized part, the information can be read out.

Figure 3A:
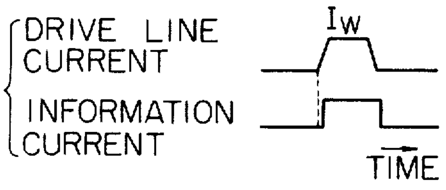
FIGS. 3A and 3B show diagrammatically driving line currents and information currents.
Figure 3B:
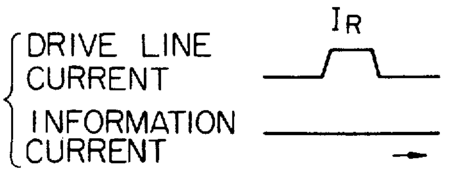

In the case of writing in, as shown in FIG. 3A, if an electric current of a fixed magnitude is made to flow through the driving line 3 and an information current $I_D$ is made to flow a little later than $I_W$ through the conductor core wire 1, a write-in in response to the magnitude of the information current will be made.

Figure 5:
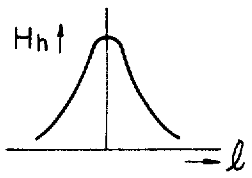

In the case of reading-out, a read-out current $I_R$ of a fixed magnitude is made to flow through the driving line, a pulse voltage proportional to the storage quantity (that is, proportional to the information current at the time of writing in) will appear in the conductor core wire 1. The relation between the information current at the time of writing in and the output pulse voltage is as shown in FIG. 5.

$$H_h = g(l) \qquad (1)$$

can be set.

Further, as the read-out pulse output voltage $V_o$ is proportional to the length $l$ of the magnetized part of the magnetic film plated wire, $$V_o = a \cdot l \qquad (2)$$

wherein $a$ is a proportion constant.

From the formula 1, $$l = g^{-1}(H_h) \qquad (3)$$

is obtained.

Figure 6:
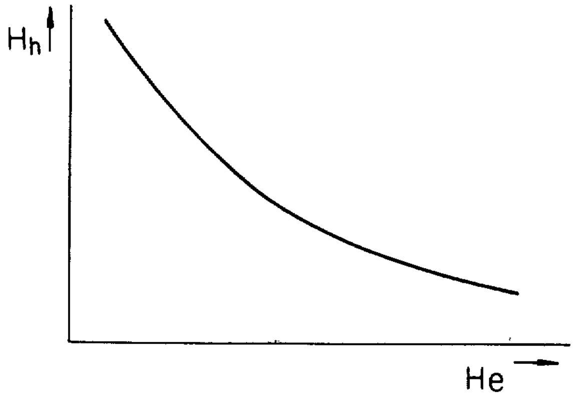

FIG. 6 shows the relation between the intensity $H_h$ of the magnetic field given to the hard magnetization axis and the intensity $H_e$ of the magnetic field given to the easy magnetization axis at the time of writing in. From FIG. 6, $$H_h = f(H_e) \qquad (4)$$

From (3) and (4), $$V_o = a \cdot g^{-1}\{f(H_e)\} \qquad (5)$$

If there is a relation of $g^{-1}\{f(H_e)\} = K \cdot H_e$ (wherein $K$ is a proportion constant) from the formula (5), $$V_o = a \cdot K \cdot H_e \qquad (6)$$

Thus it is understood that the output voltage $V_o$ is proportional to the intensity of the magnetic field given to the easy magnetization axis at the time of writing in.

Figure 4:
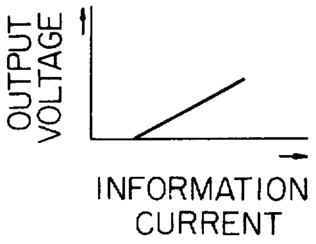
FIGS. 4 to 6 are diagrams for explaining operation of the present invention.
Figure 7:
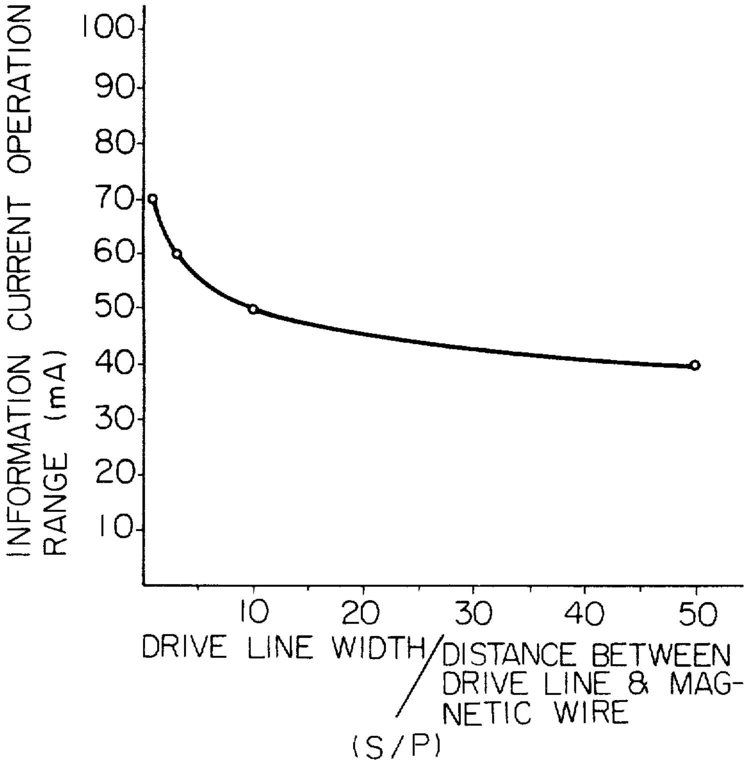
FIGS. 7 to 9 are characteristic diagrams of the present invention.

Now, when a magnetic film plated wire is made by depositing Permalloy to be 0.8 micron thick on a phosphor bronze wire of a diameter of 0.1 mm. as a conductor core wire 1, a strip line of a thickness of 50 microns and width of 0.3 mm. is made a driving wire, the width of the driving wire is made S and the distance between the driving line and magnetic film plated wire is made P, S/P will be determined as shown in FIG. 7. The value of the ordinate is a range of the information current in which the pulse output voltage in FIG. 4 is linear. In this case, if the write-in current is $I_W$ and the read-out current is $I_R$, then $I_W = I_R$. From this graph, when S/P ≦ 50, the linear operation range of the information current will be at least 40 mA.

Figure 8:
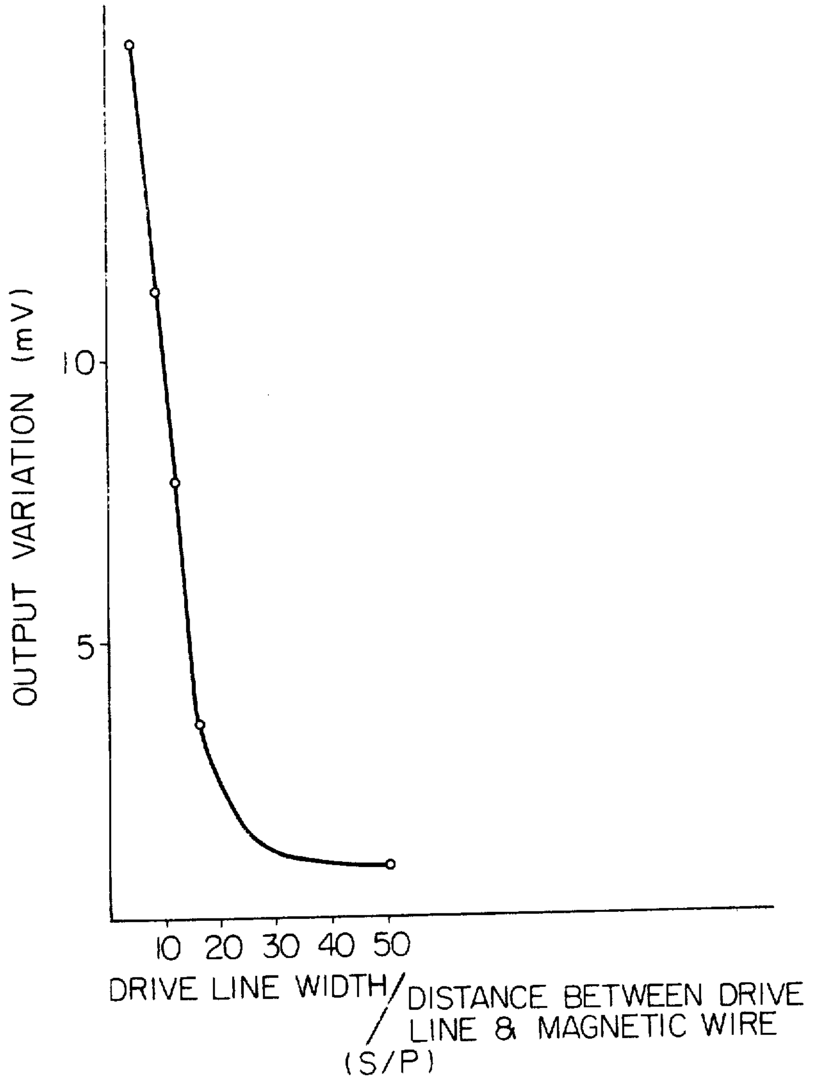

FIG. 8 shows the range (corresponding to the height of the straight line part in FIG. 4) in which the output voltage varies linearly and $S/P$. With $S/P > 50$,the curve is saturated. In this case, $I_W/I_R = ½$.

Figure 9:
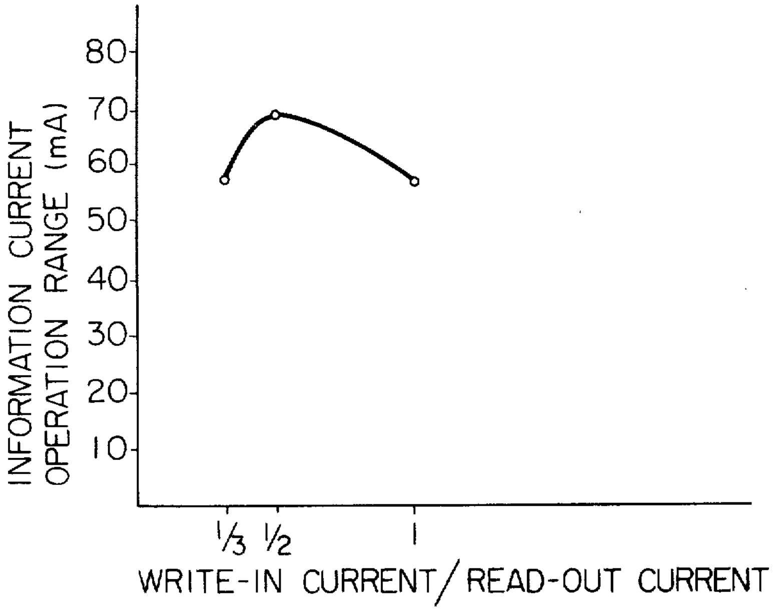

FIG. 9 shows the relation with the linear operation range of the information current (the write-in current $I_W$/read out current $I_R$) and it is understood that the linear operation range of the information current is at least 55 mA. With $I_R < I_W$, the part in which the informations are stored can not be all read out. Further, $I_W/I_R < ⅓$ is not practically sufficient.

From the above results of FIGS. 7 and 8, it is understood that, when $S/P$ ≦ 50, the output voltage at the time of reading out will be proportional to the information current at the time of writing in.

Figure 10:
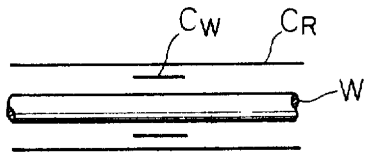
FIG. 10 shows another embodiment of the analog information storage apparatus according to the present invention.

FIG. 10 shows another embodiment of the present invention. In the apparatus in FIG. 2 as the driving line is used both at the time of write-in and at the time of read-out, generally, when a large quantity of memory is to be read out, it will be necessary to pass a large read-out current and, therefore, the memory will be likely to be broken. In FIG. 10, such defects are improved, wherein $C_R$ is a read-out strip line and $C_W$ is a write-in strip line, which are separately provided and the width of the line $C_R$ is made larger than that of the line $C_W$. W is a magnetic film plated wire. In this case, coils may be used for both $C_R$ and $C_W$.

Figure 11:
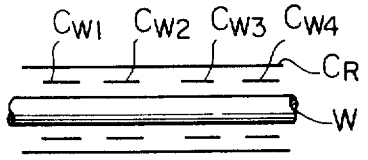
FIG. 11 is a further embodiment of the apparatus of the present invention.

FIG. 11 shows another embodiment, wherein four write-in lines $C_{W1}$, $C_{W2}$, $C_{W3}$ and $C_{W4}$ are provided to be used in the case that a sum of respective bits is required or the read-out voltage is to be made large. Even if either side of $C_W$ or $C_R$ is made inisde, the intensity of the magnetic field will be represented by $$H = H_o \exp\left(-\frac{\omega k \mu}{2} t\right).$$

Therefore, $C_W$ of $C_R$ may be made thin enough. Here, $\omega$ is an angular velocity, $k$ is a conductivity, $\mu$ is a magnetic permeability. Further, $C_W$ and $C_R$ may be solenoids.

Figure 12:
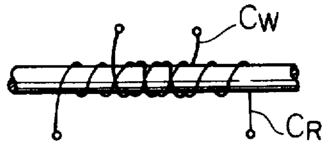
FIG. 12 shows an example of experimentally made apparatus of the invention.

FIG. 12 shows a practical embodiment of the present invention, wherein the diameter of the magnetic wire is 0.2 mm., the read-out line $C_R$ is made by winding a wire of a diameter of 0.07 mm. by 80 turns and the write-in line $C_W$ is made by winding a wire of a diameter of 0.05 mm. by 50 turns on the read-out line.

Figure 13:
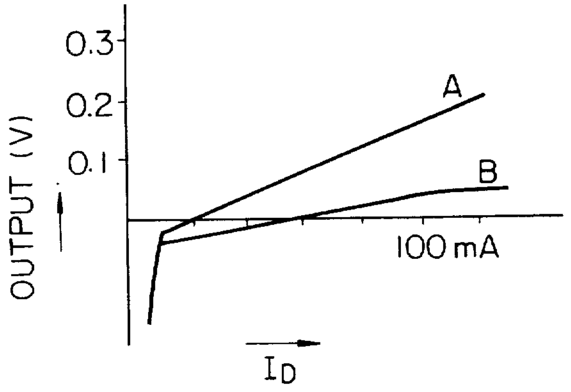
FIG. 13 is a characteristic diagram of the apparatus shown in FIG. 12.

Information current $I_D$ to output voltage $V_o$ characteristics are shown by curves A and B in FIG. 13, where a read-out current of 70 mA and a write-in current of 220 mA are used. The curve A represents the characteristic of the device of the present invention such as shown in FIG. 12 having separate read-out and write-in lines, whereas the curve B represents the characteristic of a device having a single coil which is used both as the write-in line and the read-out line. Comparing the curves A and B with each other, it will be readily seen that the use of such device as illustrated in FIG. 12 reaches a superior result, as represented by the curve A, establishing a higher level of output voltage.

In the present invention, as described above, by making the width of the read-out line larger than the width of the write-in line, a large read-out current margin can be obtained without breaking the memory.

In the first and second embodiments, the information current $I_D$ can be made constant and the write-in current $I_W$ can be made variable to achieve the aforementioned result.

Further, if $I_D$ and $I_W$ are stored as respectively made variable, two inputs will be able to be stored. Further, if $I_D$ is divided into some pulses and the number of pulses is also stored, three inputs will be able to be stored. Further, as the read-out output pulse voltage is proportional to $I_D$ and $I_W$, it is possible to have a multiplying function for $I_D$ and $I_W$.

Figure 14:
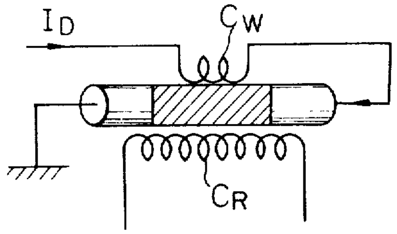
FIGS. 14 and 15 show further embodiments of the present invention.

FIG. 14 shows another embodiment wherein the write-in coil $C_W$ is connected in series with the conductor core wire 1 and the information current $I_D$ is given from the write-in coil $C_W$ side so that the driving circuit for driving the write-in coil will be eliminated. In this case, the pulses flowing into the write-in coil $C_W$ have somewhat more advanced than the pulses flowing into the conductor core wire due to the inductance of the coil and, therefore, are not unfavorable in practice.

Figure 15:
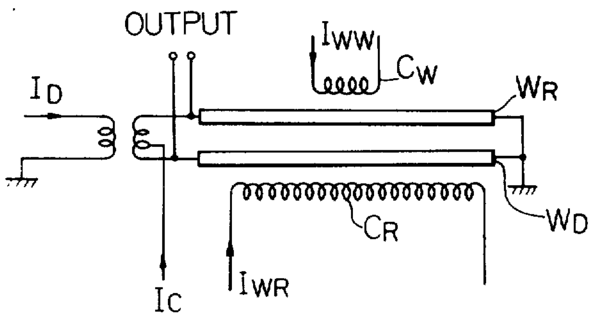

FIG. 15 shows another embodiment of the present invention, in which $W_R$ is a storing magnetic wire, $W_D$ is a magnetic wire for generating a standard information output, $C_W$ is a write-in line, $C_R$ is a read-out line, $I_c$ is a clearing current, $I_D$ is an information current, $I_{WW}$ is a write-in current and $I_{WR}$ is a read-out current.

In this apparatus, the clearing current $I_c$ is made to flow through the magnetic wires $W_R$ and $W_D$ and the clearing current is made to flow in the same direction as the information current through the magnetic wire for generating the standard information output. If the apparatus is thus cleared, after the clearing, even if an information current corresponding to the information quantity is made to flow through the standard information output generating line, in reading out, a fixed standard output will come out, the difference between the output pulse voltages of $W_R$ and $W_C$ will be obtained as an output which will not be influenced by the variations of the surrounding conditions. With such arrangement, the same member can be used as a driving circuit for both magnetic wires $W_R$ and $W_D$.

Figure 16:
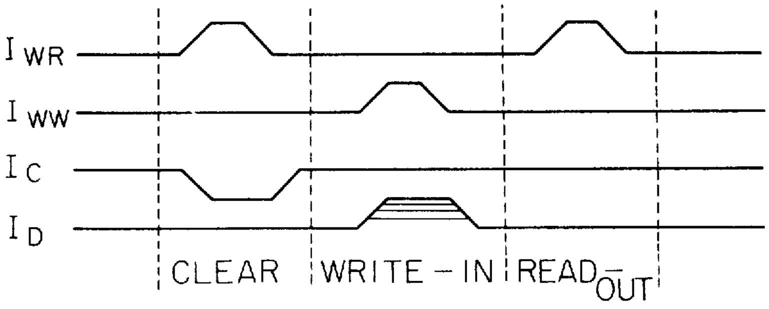
FIG. 16 is a diagram for explaining the operation of the embodiment of FIG. 15.

FIG. 16 shows operating currents and shows the presence or absence and sizes of the $I_{WR}$ (read-out current), $I_{WW}$(write-in current), $I_c$(clearing current) and $I_D$(information current) at the time of clearing, writing-in and reading-out. While in FIG. 12$I_{WR}$ and $I_{WW}$ are made separate, either of the write-in line $C_W$ and read-out line $C_R$ can be used for both.

As described above, the present invention has an effect that, by making a clearing current flow in the same direction as of the information current through the magnetic film plated wire for generating the standard information output, the driving circuit for the storing magnetic film plated wire and the magnetic film plated wire for generating the standard information output can be used in common.

What is claimed is:

1. An analog information storage apparatus comprising the combination of a. a magnetic film plated wire haivng a conductive core wire arranged in the center and a magnetic film of a single axis anisotropy arranged around said core wire, b. driving means arranged to intersect said magnetic film plated wire, said driving means including a write-in line and a read-out line, said read-out line being wider than the write-in line, c. means for passing a write-in current through said write-in line to produce a threshhold level of magnetization reversal in the direction of the easy magnetization axis, said threshhold level having a positional variation in a direction along the hard magnetization axis dependent upon the positional relationship to the write-in line, d. means for passing an analog information current through said conductive core wire having a magnitude proportional to the analog information value to be stored to produce a magnetizing field in the direction of the easy magnetization axis having a magnitude proportional to the analog current so that the direction of magnetization is reversed in the range of the magnetic film where said magnetic field exceeds said threshhold level, thereby producing in said film a reversed magnetization region having a length along the hard magnetization axis that is proportional to the analog information value, and e. means for passing a read-out current of fixed magnitude through the read-out line to produce a voltage in the conductive core wire proportional to the length of the magnetized range of said magnetic film thereby to recover the stored analog information, said conductive core wire having a current versus magnetizing field characteristic that is linear over the entire range of analog information current magnitudes so that the voltage produced in response to the read-out current is always directly proportional to the magnitude of the corresponding analog information current.

2. An analog information storage apparatus according to claim 1, wherein the means for passing a write-in current through the write-in line is adapted to produce a write-in current of fixed magnitude.

3. An analog information storage apparatus according to claim 1, wherein the driving means includes one or more additional write-in lines intersecting said magnetic film plated wire at spaced locations, the width of said read-out line being adapted to encompass all of said write-in lines, the means for passing a write-in current including means for passing individual write-in currents to the respective write-in lines, whereby the read-out voltage is made proportional to the sum of the write-in currents.

4. An analog information storage apparatus according to claim 1, wherein the means for passing a write-in current through the write-in line comprises a series connection coupling said write-in line to said conductive core whereby the analog information current is passed through both the write-in line and the conductive core.

5. A method for storing and retrieving analog information in a magnetic film plated wire having a conductive core wire arranged in the center and a magnetic film of a single axis anisotropy arranged around said core wire, with a driving means arranged to intersect said magnetic film plated wire, said method comprising a. passing a write-in current of known magnitude through said driving means to establish a threshhold level of magnetization reversal in the direction of the easy magnetization axis having a positional variation in the direction of the hard magnetization axis dependent upon the positional relationship to the driving means, b. passing an analog information current having an intensity dependent upon the analog information value to be stored to produce a magnetizing field in the direction of the easy magnetization axis having a magnitude proportional to the analog current intensity so that the direction of magnetization is reversed in a range of the magnetic film where said magnetic field exceeds said threshhold level, thereby storing said analog information by producing in said film a reversed magnetization region having a length along the hard magnetization axis that is proportional to the analog information value, and c. subsequently passing a read-out current of fixed magnitude through said driving means to produce a voltage in the conductive core wire which is proportional to the magnetized range of said magnetic film thereby to recover the stored analog information, said conductive core wire having a current versus magnetizing field characteristic that is linear over the entire range of analog information current magnitudes so that the voltage produced in response to the read-out current is always directly proportional to the magnitude of the corresponding analog information current.

6. A method of storing analog information according to claim 5 wherein the step of passing a write-in current includes the step of varying said known current according to a second information signal to be stored, thereby to make said threshhold level dependent upon said second information signal.

7. A method of storing analog information according to claim 5 wherein the step of passing an electric current of known magnitude through said driving means to establish a threshhold level of magnetization reversal includes passing said current of fixed magnitude.

8. A method of storing analog information according to claim 7 wherein said driving means includes a write-in line and a read-out line, the step of passing said write-in current including passing said current through the write-in line, the step of passing said read-out current including passing said current through said read-out line, said method including the further step of making the magnitude of said read-out current greater than the magnitude of said write-in current.

9. A method of storing analog information according to claim 8 wherein said write-in current is related to said read-out current by a ratio of write-in current to read-out current having a minimum of about one third and a maximum approaching unity.

* * * * *